(12) United States Patent
Ikeo et al.

(10) Patent No.: US 10,073,238 B2
(45) Date of Patent: Sep. 11, 2018

(54) LENS BARREL AND IMAGING APPARATUS

(71) Applicant: Panasonic Intellectual Property Management Co., Ltd., Osaka (JP)

(72) Inventors: Kenji Ikeo, Osaka (JP); Tsutomu Yoshikawa, Nara (JP); Masahiro Inata, Hyogo (JP); Hideo Onishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 14/922,837

(22) Filed: Oct. 26, 2015

(65) Prior Publication Data
US 2016/0041365 A1 Feb. 11, 2016

Related U.S. Application Data (63) Continuation of application No. PCT/JP2014/005523, filed on Oct. 31, 2014.

(30) Foreign Application Priority Data

Dec. 10, 2013 (JP) ................................ 2013-254952

(51) Int. Cl.
*G02B 15/22* (2006.01)
*G02B 15/14* (2006.01)
(Continued)

(52) U.S. Cl.
CPC ............... *G02B 7/105* (2013.01); *G02B 7/08* (2013.01); *G02B 7/09* (2013.01); *G02B 7/102* (2013.01); *G02B 27/0006* (2013.01)

(58) Field of Classification Search
CPC ...... G02B 7/105; G02B 7/102; G02B 15/173; G02B 7/021; G02B 7/14; G02B 7/023; G02B 7/04; G02B 7/026; G11B 7/0932
(Continued)

(56) References Cited

U.S. PATENT DOCUMENTS 4,456,342 A 6/1984 Muryoi
4,806,000 A 2/1989 Shiokama et al.
(Continued)

FOREIGN PATENT DOCUMENTS

JP 55-144309 U 10/1980
JP 57-066425 4/1982
(Continued)

OTHER PUBLICATIONS

International Search Report of PCT application No. PCT/JP2014/005523 dated Feb. 3, 2015.

*Primary Examiner* — Dawayne A Pinkney
(74) *Attorney, Agent, or Firm* — Wenderoth, Lind & Ponack, L.L.P.

(57) ABSTRACT

A lens barrel: an optical system; a focusing manipulation unit capable of changing a focal position of the optical system in a normal photographing area and in a macro photographing area where the focal position can be changed for an object located at a position shorter than a shortest distance position of the normal photographing area; a photographing mode switching unit for switching between a normal photographing mode and a macro photographing mode; and an index ring having a normal scale and a macro scale, the normal scale indicating an object distance in the normal photographing mode, and the macro scale indicating the object distance in the macro photographing mode. Then, the photographing mode switching unit switches a display position of the index ring between the normal scale and the macro scale, and the focusing manipulation unit changes the focal position displayed on the index ring by rotation manipulation.

6 Claims, 8 Drawing Sheets

(51) Int. Cl.
  *G02B 7/02*   (2006.01)
  *G02B 7/105*  (2006.01)
  *G02B 7/10*   (2006.01)
  *G02B 7/09*   (2006.01)
  *G02B 7/08*   (2006.01)
  G02B 27/00    (2006.01)

(58) Field of Classification Search
  USPC ............... 359/706, 705, 694, 676, 811–830
  See application file for complete search history.

(56) References Cited

U.S. PATENT DOCUMENTS

| | | | | |
|---|---|---|---|---|
| 4,944,030 A | * | 7/1990 | Haraguchi | ............ G02B 7/102 |
| | | | | 396/148 |
| 2015/0277080 A1 | * | 10/2015 | Ikeo | ....................... G02B 7/105 |
| | | | | 359/825 |

FOREIGN PATENT DOCUMENTS

| JP | 59-134140 U | 9/1984 |
|---|---|---|
| JP | 61-011685 Y | 4/1986 |
| JP | 61-185712   | 8/1986 |

* cited by examiner

LENS BARREL AND IMAGING APPARATUS

TECHNICAL FIELD

The present disclosure relates to a lens barrel and an imaging apparatus.

BACKGROUND ART

PTL 1 discloses a lens barrel in which a movement permissible range of a focus ring is adjusted by a lock member provided at a zoom ring.

CITATION LIST

Patent Literature

PTL 1: Unexamined Japanese Patent Publication No. S57-66425

SUMMARY OF THE INVENTION

The present disclosure provides a lens barrel capable of switching between normal photographing and macro photographing and an imaging apparatus provided with the lens barrel. The lens barrel is capable of displaying a scale of a focus ring, and is capable of displaying a photographing distance range during the normal photographing and a photographing distance range during the macro photographing within the same movement permissible range of the focus ring.

A lens barrel in the present disclosure includes: an optical system formed of a plurality of lenses; a focusing manipulation unit capable of changing a focal position of the optical system in a normal photographing area and in a macro photographing area where the focal position can be changed for an object located at a position shorter than a shortest distance position of the normal photographing area; a photographing mode switching unit for switching between a normal photographing mode and a macro photographing mode by moving at least a part of lenses among the plurality of lenses of the optical system; and an index ring having a normal scale and a macro scale, the normal scale indicating an object distance in the normal photographing mode, and a macro scale provided at a position different from the position of the normal scale and indicating the object distance in the macro photographing mode. Then, the photographing mode switching unit switches a display position of the index ring between the normal scale and the macro scale, and the focusing manipulation unit changes the focal position displayed on the index ring by rotation manipulation.

A lens barrel comprised an imaging apparatus in the present disclosure includes: an optical system formed of a plurality of lenses; a focusing manipulation unit capable of changing a focal position of the optical system in a normal photographing area and in a macro photographing area where the focal position can be changed for an object located at a position shorter than a shortest distance position of the normal photographing area; a photographing mode switching unit for switching between a normal photographing mode and a macro photographing mode by moving at least a part of lenses among the plurality of lenses of the optical system; and an index ring having a normal scale and a macro scale, the normal scale indicating an object distance in the normal photographing mode, and the macro scale provided at a position different from the position of the normal scale and indicating the object distance in the macro photographing mode. Then, the photographing mode switching unit switches a display position of the index ring between the normal scale and the macro scale, and the focusing manipulation unit changes the focal position displayed on the index ring by rotation manipulation.

The lens barrel in the present disclosure is capable of switching between normal photographing and macro photographing, is capable of displaying a scale of a focus ring, and is capable of displaying a focal position range during the normal photographing and a focal position range during the macro photographing while keeping a movement permissible range of the focus ring constant.

DESCRIPTION OF EMBODIMENTS

Hereinafter, exemplary embodiments will be described in detail while appropriately referring to the drawings. However, unnecessarily detailed description may be omitted. For example, detailed description of a matter that has been already well-known or overlapping description of substantially the same configuration may be omitted. This is to avoid unnecessary redundancy of the following description and to be easily understood by those skilled in the art.

The accompanying drawings and the following description are provided so that those skilled in the art fully understand the present disclosure. It is not intended that a subject described in the claims be limited by these drawings and description.

First Exemplary Embodiment 1-1. Configuration of Digital Camera

Figure 1:
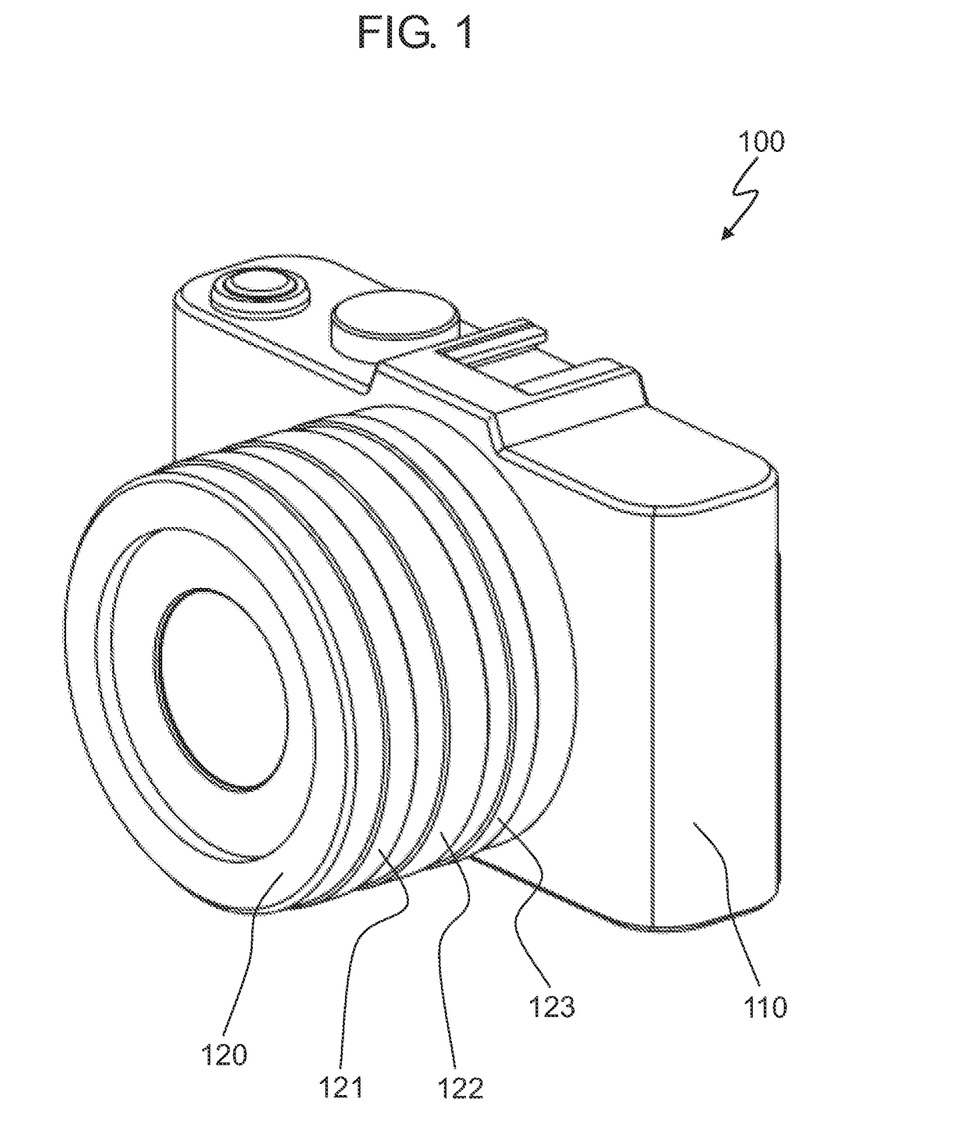
FIG. 1 is a perspective view of a digital camera in a first exemplary embodiment.

FIG. 1 is a perspective view of digital camera 100. Digital camera 100 has camera body 110 and lens barrel 120. Lens barrel 120 may be configured integrally with camera body 110 or may be provided detachably. Further, iris ring 121, focus ring 122, and macro ring 123, which are manipulated by a user, are provided on an outer periphery of lens barrel 120. Digital camera 100 is one example of an imaging apparatus, and focus ring 122 is one example of a focusing manipulation unit.

Figure 2:
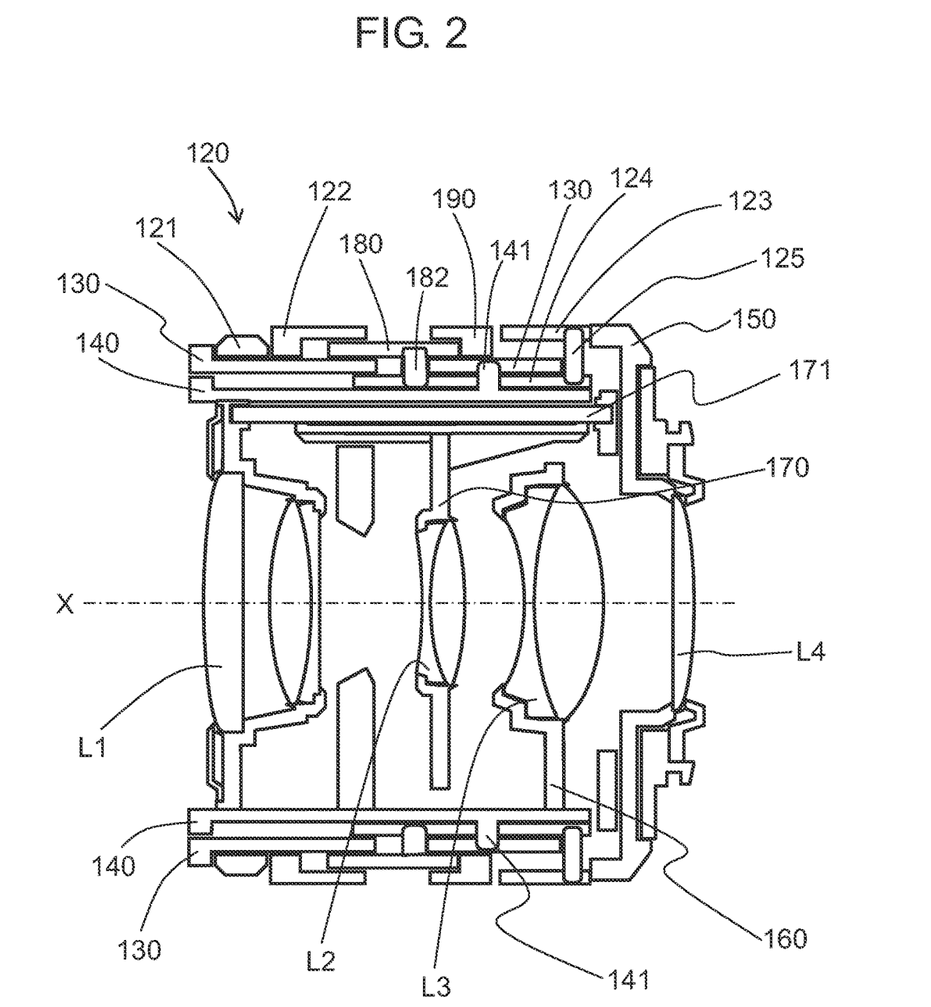
FIG. 2 is a schematic diagram illustrating a sectional configuration of a lens barrel in a normal mode according to the first exemplary embodiment.
Figure 3:
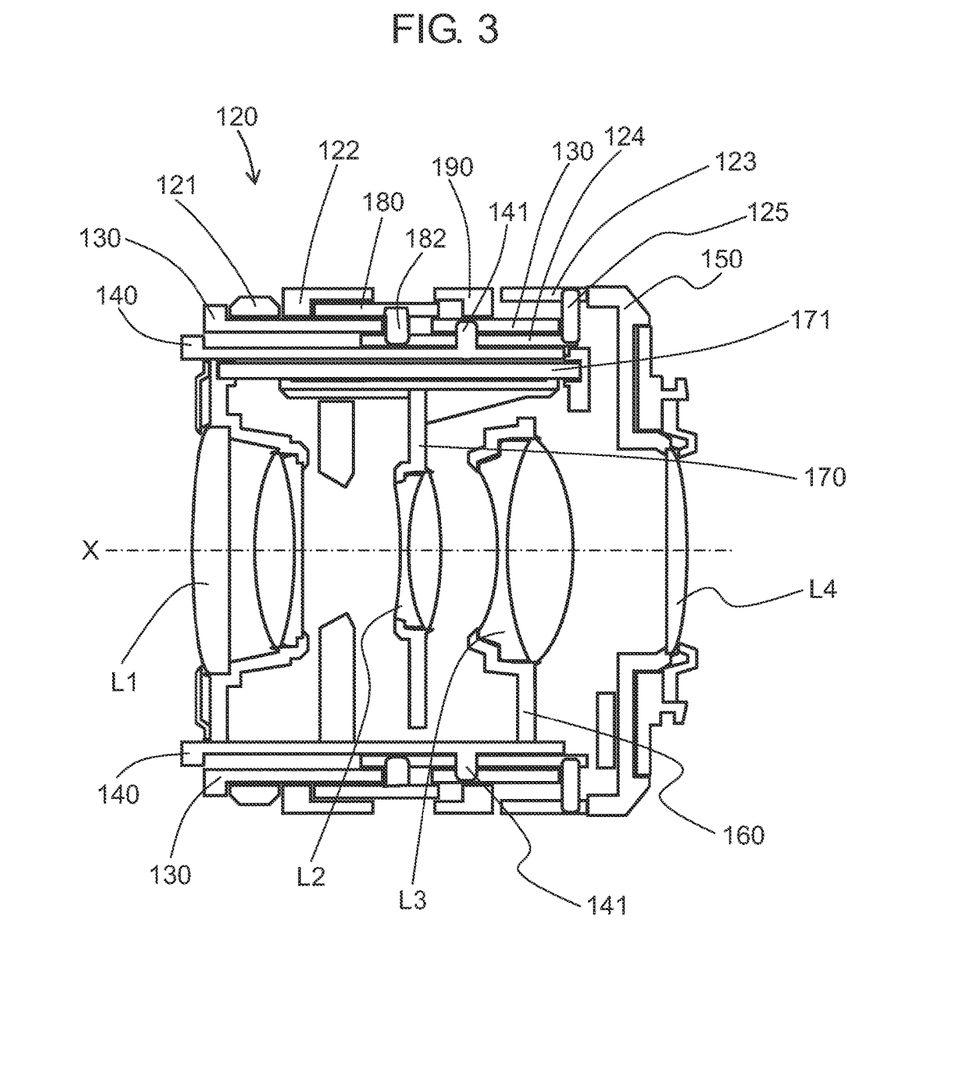
FIG. 3 is a schematic diagram illustrating a sectional configuration of the lens barrel in a macro mode according to the first exemplary embodiment.

Next, a configuration of lens barrel 120 will be described. FIG. 2 is a schematic diagram illustrating a sectional configuration of lens barrel 120 in a normal mode. FIG. 3 is a schematic diagram illustrating a sectional configuration of lens barrel 120 in a macro mode.

Lens barrel 120 includes first lens group L1, focus lens group L2, third lens group L3, fourth lens group L4, iris ring 121, focus ring 122, macro ring 123, fixed frame 130, rectilinear frame 140, base frame 150, three-group holding frame 160, focus lens frame 170, guide shaft 171, index ring 180, cam frame 124, index ring driving pin 182, cam frame driving pin 125, and decorative ring 190. Rectilinear frame 140 has rectilinear frame driving pin 141 protruded to an outer peripheral side. Cam frame 124 is engaged with macro ring 123 via cam frame driving pin 125.

Lens barrel 120 is configured in such a manner that the respective members are mounted to base frame 150. Base frame 150 holds fourth lens group L4. Fixed frame 130 is screwed to an object side of base frame 150 (not illustrated).

Next, the members provided on an inner peripheral side of fixed frame 130 will be described. On the inner peripheral side of fixed frame 130, rectilinear frame 140 is movably mounted in an optical axis X direction. Specifically, rectilinear frame driving pin 141 protruded to the outer peripheral side of rectilinear frame 140 is engaged with cam frame 124 and fixed frame 130. By rotation operation of macro ring 123, cam frame 124 is rotated, and rectilinear frame 140 is moved in the optical axis X direction.

Rectilinear frame 140 holds first lens group L1. Further, three-group holding frame 160 is fixed to rectilinear frame 140. Three-group holding frame 160 holds third lens group L3. Rectilinear frame 140 is provided with guide shaft 171. Focus lens frame 170 is mounted movably in the optical axis X direction on guide shaft 171 provided at rectilinear frame 140. Focus lens frame 170 holds focus lens group L2. Focus lens frame 170 is engaged with guide shaft 171 held parallel to optical axis X by rectilinear frame 140, and is driven in the optical axis X direction by a power source (not illustrated), such as an actuator.

Next, the members provided on an outer peripheral side of fixed frame 130 will be described. Fixed frame 130 includes iris ring 121, focus ring 122, macro ring 123, index ring 180, and decorative ring 190. Iris ring 121 is rotatable with respect to fixed frame 130 in a circumferential direction of lens barrel 120 according to user's manipulation. Focus ring 122 is rotatable with respect to fixed frame 130 in the circumferential direction of lens barrel 120 according to user's manipulation. Macro ring 123 is rotatable with respect to fixed frame 130 in the circumferential direction of lens barrel 120 according to user's manipulation.

1-2. Operation of Digital Camera

Operation of digital camera 100 configured as above will be described. Digital camera 100 is configured in such a manner that a photographable object distance range is changed by switching between a normal mode (normal photographing mode) and a macro mode (macro photographing mode). In the present exemplary embodiment, the normal mode is a photographing mode suitable for a case where a distance to an object is in a range from 0.3 m to ∞ inclusive, and the macro mode is a photographing mode suitable for a case where the distance to the object is from 0.15 m to 0.35 m inclusive. As illustrated in FIGS. 4A to 4C and FIGS. 5A to 5C, digital camera 100 adjusts a position of index ring 180 in the optical axis X direction in response to switching between the normal mode and the macro mode.

Figure 4A:
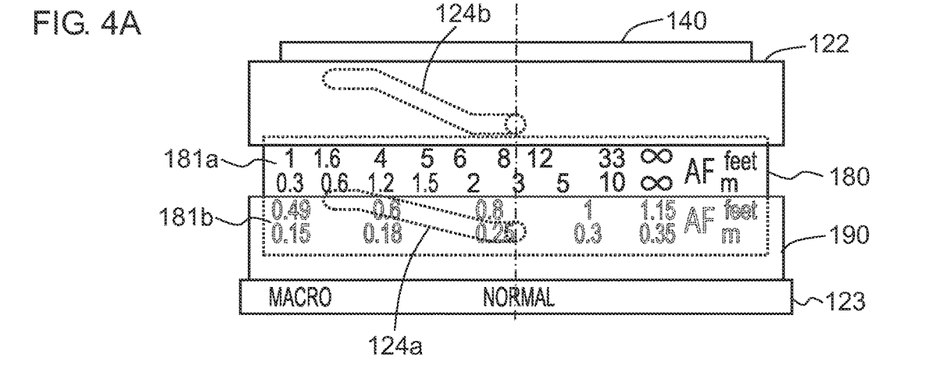
FIG. 4A is a diagram illustrating a focus index of an index ring in the normal mode according to the first exemplary embodiment.
Figure 4B:
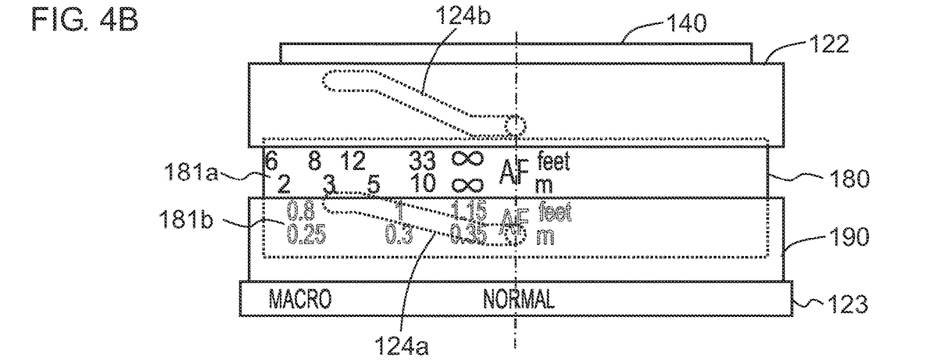
FIG. 4B is a diagram of a case where the focus index indicates an auto focus mode in the normal mode according to the first exemplary embodiment.
Figure 4C:
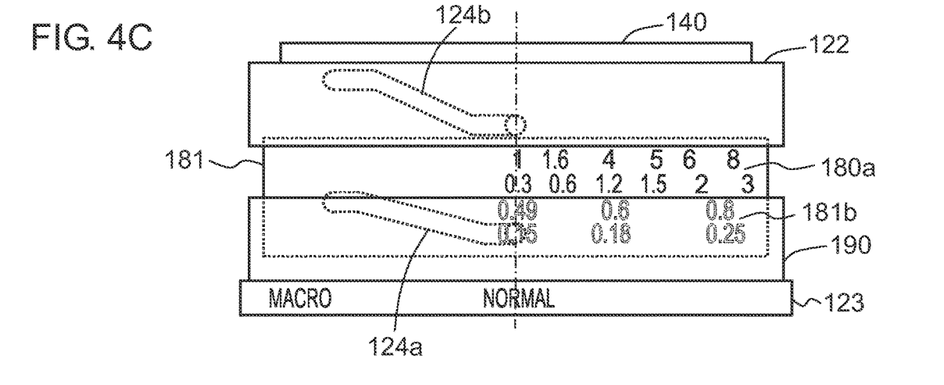
FIG. 4C is a diagram of a case where the focus index indicates a short distance in the normal mode according to the first exemplary embodiment.

FIGS. 4A to 4C illustrate positional relations among macro ring 123, cam frame groove 124A for a rectilinear frame, cam frame groove 124b for an index ring, and index ring 180 in the normal mode. FIG. 4A is a diagram illustrating a focus index of index ring 180, FIG. 4B is a diagram of a case where the focus index indicates an auto focus mode, and FIG. 4C is a diagram of a case where the focus index indicates a short distance.

Figure 5A:
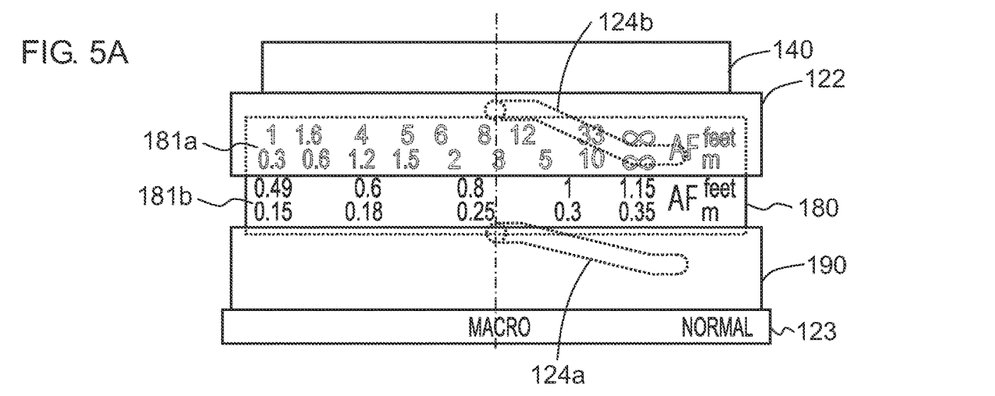
FIG. 5A is a diagram illustrating a focus index of the index ring in the macro mode according to the first exemplary embodiment.
Figure 5B:
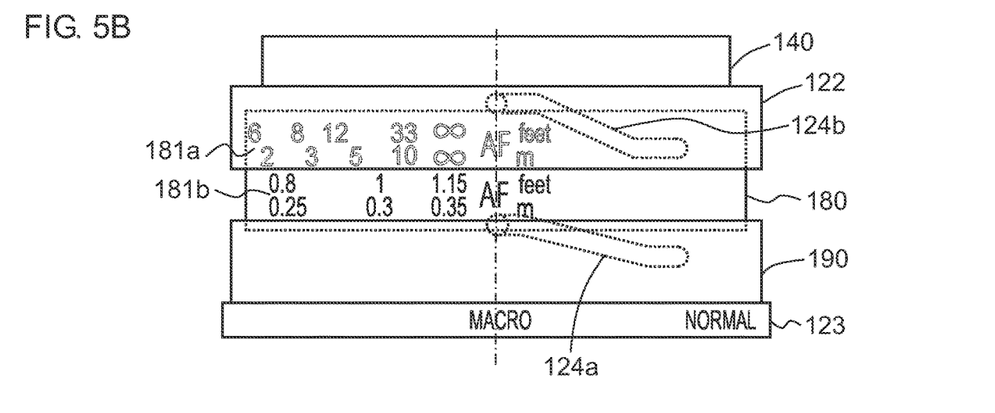
FIG. 5B is a diagram of a case where the focus index indicates an auto focus mode in the macro mode according to the first exemplary embodiment.
Figure 5C:
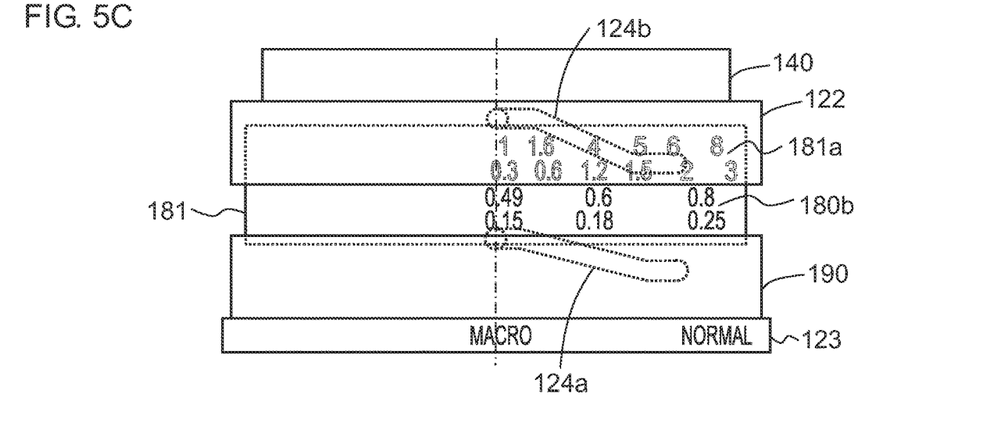
FIG. 5C is a diagram of a case of indicating a focus index short distance in the macro mode according to the first exemplary embodiment.

FIGS. 5A to 5C illustrate positional relations among macro ring 123, cam frame groove 124A for a rectilinear frame, cam frame groove 124b for an index ring, and index ring 180 in the macro mode. FIG. 5A is a diagram illustrating a focus index of index ring 180, FIG. 5B is a diagram of a case where the focus index indicates an auto focus mode, and FIG. 5C is a diagram of a case where the focus index indicates a short distance.

As illustrated in FIGS. 4A to 4C and FIGS. 5A to 5C, the focus index indicating an object distance is printed on an exterior surface of index ring 180. On an upper stage (the object side) in the optical axis X direction, an object distance range (e.g., from 0.3 m to ∞ m inclusive, and its feet equivalent distance) during photographing in the normal mode is displayed as normal scale 181a. Further, on a lower stage (the camera body side) of index ring 180, an object distance range (e.g., from 0.15 m to 0.35 m inclusive, and its feet equivalent distance) during photographing in the macro mode is displayed as macro scale 181b. Here, shortest distances (0.3 m in the normal mode and 0.15 m in the macro mode) and longest distances (∞ in the normal mode and 0.35 m in the macro mode) are located in the same phase of index ring 180 in the circumferential direction. "AF" (the upper stage) indicating an auto focus mode in the normal mode and "AF" (the lower stage) indicating an auto focus mode in the macro mode are also displayed at the same phase position of index ring 180 in the circumferential direction. In the present exemplary embodiment, the notation "AF" of the auto focus mode is provided so as to be adjacent to a longest distance side ("∞" or the like). However, the present invention is not limited to this, and the notation "AF" may be provided on a shortest distance side ("0.3" or the like). When the focus index is set to "AF", the auto focus mode in each mode is set. In the auto focus mode, a user can perform automatic focusing regardless of the object distance.

Further, an index "NORMAL" indicating the normal mode and an index "MACRO" indicating the macro mode are printed on an exterior of macro ring 123.

As described above, index ring 180 has normal scale 181a and macro scale 181b arranged in two stages in the optical axis X direction. According to user's rotation manipulation of macro ring 123, index ring 180 can be driven with respect to fixed frame 130 in the optical axis X direction, and marks of normal scale 181a and macro scale 181b are switched. In other words, when macro ring 123 is rotated in a left direction by user's manipulation and the "NORMAL" mark of macro ring 123 is located on an upper surface, normal scale 181a is displayed between focus ring 122 and decorative ring 190. Further, when macro ring 123 is rotated in a right direction by the user's manipulation and the "MACRO" mark of macro ring 123 is located on the upper surface, macro scale 181b is displayed between focus ring 122 and decorative ring 190.

Further, according to user's rotation manipulation of focus ring 122, index ring 180 is rotatable with respect to fixed frame 130 in the circumferential direction of lens barrel 120. It should be noted that rotatable ranges of iris ring 121, focus ring 122, and macro ring 123 are respectively set. The rotatable range will be described below.

Figure 6A:
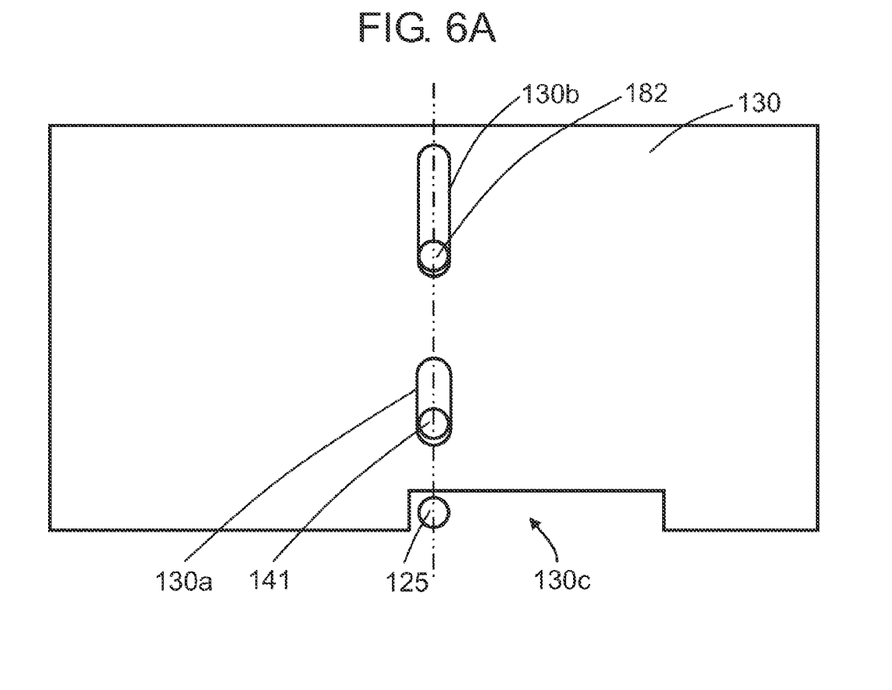
FIG. 6A is a partial developed view of a fixed frame in the first exemplary embodiment.
Figure 6B:
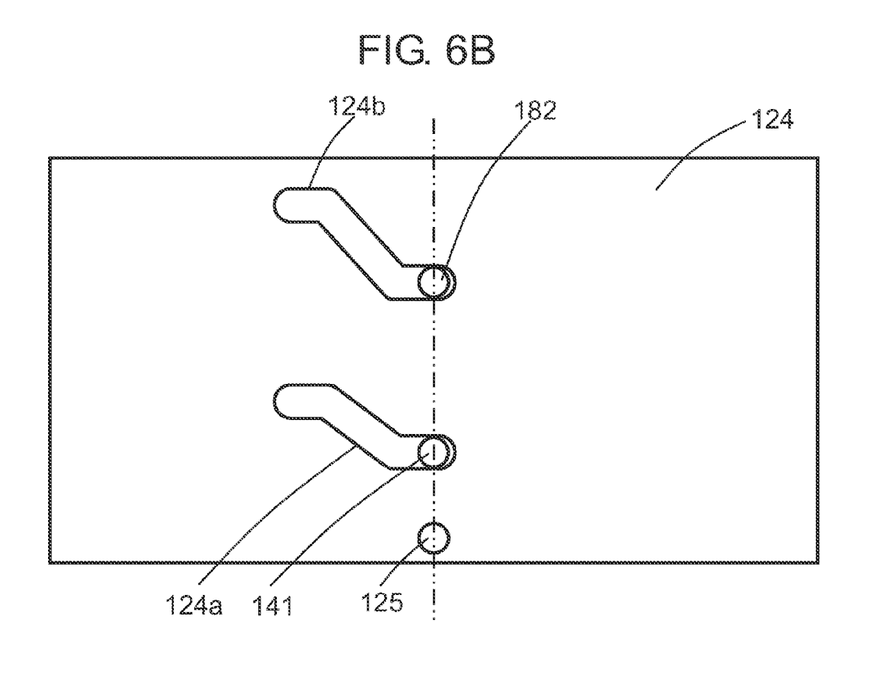
FIG. 6B is a partial developed view of a cam frame in the first exemplary embodiment.

FIG. 6A is a partial developed view of fixed frame 130, and FIG. 6B is a partial developed view of cam frame 124. FIGS. 6A and 6B are drawings viewed from the outer peripheral side.

As illustrated in FIG. 6A, fixed frame 130 has fixed frame groove 130a for a rectilinear frame with which rectilinear frame driving pin 141 is engaged, fixed frame groove 130b for an index ring with which index ring driving pin 182 is engaged, and cam frame rotation regulating groove 130c with which cam frame driving pin 125 is engaged. Fixed frame groove 130a for a rectilinear frame has a predetermined length in the optical axis X direction, and regulates movement of rectilinear frame 140 by engaging with rectilinear frame driving pin 141. In other words, rectilinear frame 140 is allowed to move in the optical axis X direction only by a predetermined distance, and is regulated not to rotate in the circumferential direction by fixed frame groove 130a for a rectilinear frame. Fixed frame groove 130b for an index ring has a predetermined length in the optical axis X direction, and regulates movement of index ring 180 by engaging with index ring driving pin 182. In other words, index ring 180 is allowed to move in the optical axis X direction only by a predetermined distance, and is regulated not to rotate in the circumferential direction by fixed frame groove 130b for an index ring. Cam frame rotation regulating groove 130c has a predetermined length in the circumferential direction, and regulates movement of cam frame 124 by engaging with cam frame driving pin 125. In other words, cam frame 124 is allowed to rotate and move in the circumferential direction only by a predetermined distance, and is regulated not to move in the optical axis X direction by cam frame rotation regulating groove 130c.

As illustrated in FIG. 6B, cam frame 124 has cam frame groove 124a for a rectilinear frame with which rectilinear frame driving pin 141 is engaged, cam frame groove 124b for an index ring with which index ring driving pin 182 is engaged, and cam frame driving pin 125. Cam frame groove 124a for a rectilinear frame has a predetermined length in the optical axis X direction and in the circumferential direction, and regulates movement of rectilinear frame 140 by engaging with rectilinear frame driving pin 141. In other words, by the rotational movement of cam frame 124, rectilinear frame 140 is driven in the optical axis X direction only by a predetermined distance via rectilinear frame driving pin 141 engaged with cam frame groove 124a for a rectilinear frame. Cam frame groove 124b for an index ring has a predetermined length in the optical axis X direction and in the circumferential direction and regulates movement of index ring 180 by engaging with index ring driving pin 182. In other words, by the rotational movement of cam frame 124, index ring 180 is driven in the optical axis X direction only by a predetermined distance via index ring driving pin 182 engaged with cam frame groove 124b for an index ring. Cam frame driving pin 125 is fixed to cam frame 124 by a fixing member, such as a screw, or is configured as a protrusion integral with cam frame 124. By engaging with macro ring 123, cam frame driving pin 125 transmits rotational drive of macro ring 123 by user's manipulation to cam frame 124.

In this way, when the user rotationally manipulates macro ring 123, cam frame 124 is rotated, rectilinear frame 140 is moved in the optical axis X direction, and index ring 180 is simultaneously moved in the optical axis X direction. A moving amount of rectilinear frame 140 in the optical axis X direction during the manipulation of macro ring 123 is determined by a length of cam frame groove 124a for a rectilinear frame in the optical axis X direction. Further, a moving amount of index ring 180 in the optical axis X direction is determined by a length of cam frame groove 124b for an index ring in the optical axis X direction.

As mentioned above, since cam frame driving pin 125 is engaged with cam frame rotation regulating groove 130c, a length of cam frame rotation regulating groove 130c extending in the circumferential direction of fixed frame 130 becomes a movable range of cam frame driving pin 125 in the circumferential direction. Moreover, since cam frame driving pin 125 is also engaged with macro ring 123, movable ranges of macro ring 123 and cam frame 124 are determined by cam frame rotation regulating groove 130c.

Figure 7A:
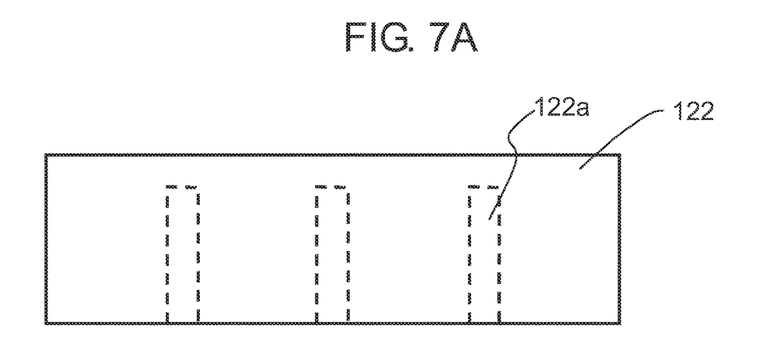
FIG. 7A is a partial developed view of a focus ring in the first exemplary embodiment.
Figure 7B:
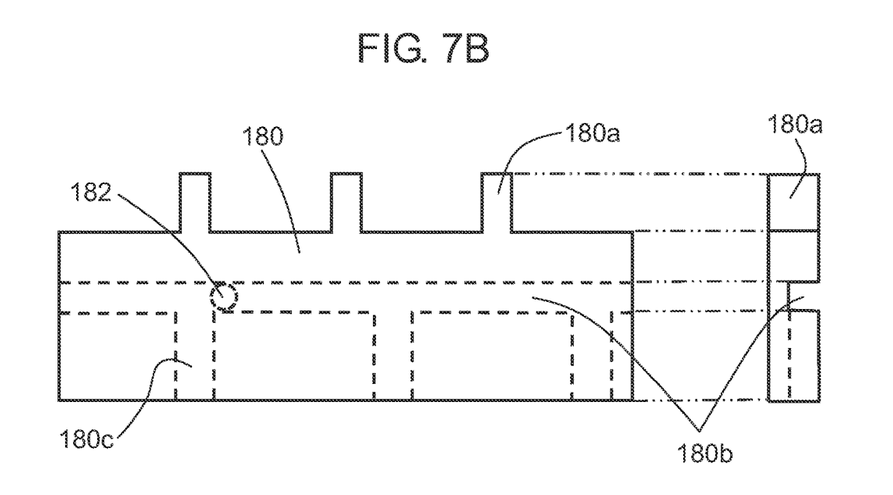
FIG. 7B is a diagram explaining a configuration of the index ring in the first exemplary embodiment.

FIG. 7A is a partial developed view of focus ring 122, and FIG. 7B is a partial developed view and side view of index ring 180. The partial developed views of FIGS. 7A and 7B are seen from the outer peripheral side, and a shape on an inner peripheral side is indicated by broken lines. As illustrated in FIG. 7A, focus ring 122 has index ring rotation regulating groove 122a extending in the optical axis X direction on the inner peripheral side. As illustrated in FIG. 7B, index ring 180 has index ring rotation regulating protrusion 180a extending in the optical axis X direction, index ring optical axis regulating groove 180b, and vertical groove 180c for assembling. Index ring rotation regulating protrusion 180a is engaged with index ring rotation regulating groove 122a of focus ring 122 illustrated in FIG. 7A. With this configuration, movement of index ring 180 in the rotation direction is regulated. Index ring optical axis regulating groove 180b is a groove for not regulating the movement of index ring driving pin 182 in the circumferential direction in a case where index ring 180 is rotated along with rotation of focus ring 122. In other words, index ring driving pin 182 receives a driving force from cam frame groove 124b for an index ring by the rotation of cam frame 124, and drives index ring 180 in the optical axis X direction. However, depending on the rotation of index ring 180, index ring driving pin 182 does not receive a force in the circumferential direction by moving index ring optical axis regulating groove 180b. Vertical groove 180c for assembling is a groove for inserting index ring driving pin 182 during assembling.

In this way, since index ring 180 is rotated according to the rotation of focus ring 122, the focus index serving as an object distance corresponding to a rotation position of focus ring 122 is located on an upper surface of index ring 180.

1-3. Switching Between Normal Mode and Macro Mode

A user can switch between the normal mode and the macro mode by rotationally manipulating macro ring 123. Macro ring 123 is one example of a photographing mode switching unit.

<Normal Mode>

As illustrated in FIGS. 4A to 4C, when macro ring 123 is rotated in the left direction and the notation of "NORMAL" indicated on macro ring 123 is moved to an upper center of lens barrel 120, the normal mode is set. When macro ring 123 is rotationally driven in the left direction, cam frame driving pin 125 engaged with macro ring 123 and fixed to cam frame 124 is moved along cam frame rotation regulating groove 130c. When cam frame driving pin 125 abuts on a left end of cam frame rotation regulating groove 130c, rotational movement of macro ring 123 is regulated, and the notation of "NORMAL" indicating the normal mode is located on the upper center of lens barrel 120.

When macro ring 123 is rotationally driven in the left direction, cam frame 124 is rotated in the left direction via cam frame driving pin 125 engaged with macro ring 123. When cam frame 124 is rotated in the left direction, rectilinear frame driving pin 141 is moved along cam frame groove 124a for a rectilinear frame of cam frame 124 engaged with rectilinear frame driving pin 141, and index ring driving pin 182 is moved along cam frame grave 124b for an index ring of cam frame 124 engaged with index ring driving pin 182. Rectilinear frame driving pin 141 and index ring driving pin 182 reach the respective grooves on the camera body side (right end) (FIG. 6B). Accordingly, in the normal mode, as illustrated in FIG. 2, rectilinear frame 140 and index ring 180 are held in fixed frame 130 in a state of being located on the camera body side. When rectilinear frame 140 is located on the camera body side, the lens groups held by the rectilinear frame 140 are located on the camera body side and become optical system arrangement in the normal mode. As illustrated in FIGS. 4A to 4C, when index ring 180 is located on the camera body side, normal scale 181a serving as a focus index for the normal mode is displayed between focus ring 122 and decorative ring 190.

<Macro Mode>

As illustrated in FIGS. 5A to 5C, when the user rotates macro ring 123 in the right direction and the notation of "MACRO" indicated on macro ring 123 is moved to the upper center of lens barrel 120, the macro mode is set. When macro ring 123 is rotationally driven in the right direction, cam frame driving pin 125 engaged with macro ring 123 and fixed to cam frame 124 is moved along cam frame rotation regulating groove 130c. When cam frame driving pin 125 abuts on a right end of cam frame rotation regulating groove 130c, rotational movement of macro ring 123 is regulated, and the notation of "MACRO" indicating the macro mode is located on the upper center of lens barrel 120.

When macro ring 123 is rotationally driven in the right direction, cam frame 124 is rotated in the right direction via cam frame driving pin 125 engaged with macro ring 123. When cam frame 124 is rotated in the right direction, rectilinear frame driving pin 141 is moved along cam frame groove 124a for a rectilinear frame of cam frame 124 engaged with rectilinear frame driving pin 141, and index ring driving pin 182 is moved along cam frame grave 124b for an index ring of cam frame 124 engaged with index ring driving pin 182. Rectilinear frame driving pin 141 and index ring driving pin 182 reach the respective grooves on the object side (left end). Accordingly, in the macro mode, as illustrated in FIG. 3, rectilinear frame 140 and index ring 180 are held in fixed frame 130 in a state of being moved to the object side. When rectilinear frame 140 is located on the object side, the lens groups held by rectilinear frame 140 are located on the object side and become optical system arrangement in the macro mode. As illustrated in FIGS. 5A to 5C, when index ring 180 is located on the object side, macro scale 181b serving as a focus index for the macro mode is displayed between focus ring 122 and decorative ring 190.

1-4. Movable Ranges of Index Ring and Focus Ring

As mentioned above, index ring 180 is driven in the optical axis X direction and switching between the normal mode and the macro mode is performed by switching the rotation of macro ring 123.

On the other hand, index ring 180 is rotationally moved in the circumferential direction according to rotation manipulation of focus ring 122, and position regulation of index ring 180 in the circumferential direction is realized by engaging index ring rotation regulating protrusion 180a with index ring rotation regulating groove 122a of focus ring 122. In the present exemplary embodiment, a rotation movable range of focus ring 122, i.e., a rotation movable range of index ring 180, is realized by contact of a protrusion (not illustrated) provided at fixed frame 130 with a protrusion (not illustrated) provided at focus ring 122.

In the normal mode, when focus ring 122 is rotated to abut on an end on the long distance side, index ring 180 is rotated to the position indicating the auto focus "AF" (FIG. 4B). On the contrary, when focus ring 122 is rotated to abut on an end on the short distance side, index ring 180 is rotated to the position of "0.3" indicating 0.3 m (FIG. 4C).

In the macro mode, when focus ring 122 is rotated to abut on an end on the long distance side, index ring 180 is rotated to the position indicating the auto focus "AF" (FIG. 5B). On the contrary, when focus ring 122 is rotated to abut on an end on the short distance side, index ring 180 is rotated to the position of "0.15" indicating 0.15 m (FIG. 5C).

1-5. Effects

As described above, in the present exemplary embodiment, index ring 180 is displaced in the optical axis X direction during the switching between the normal mode and the macro mode by the user. Additionally, index ring 180 is rotated in the circumferential direction according to the manipulation of focus ring 122 by the user.

With this configuration, only a photographable object distance range according to the mode is indicated on index ring 180. Accordingly, the object distance can be also displayed with index ring 180 on lens barrel 120 provided with mode switching.

Second Exemplary Embodiment

Figure 8:
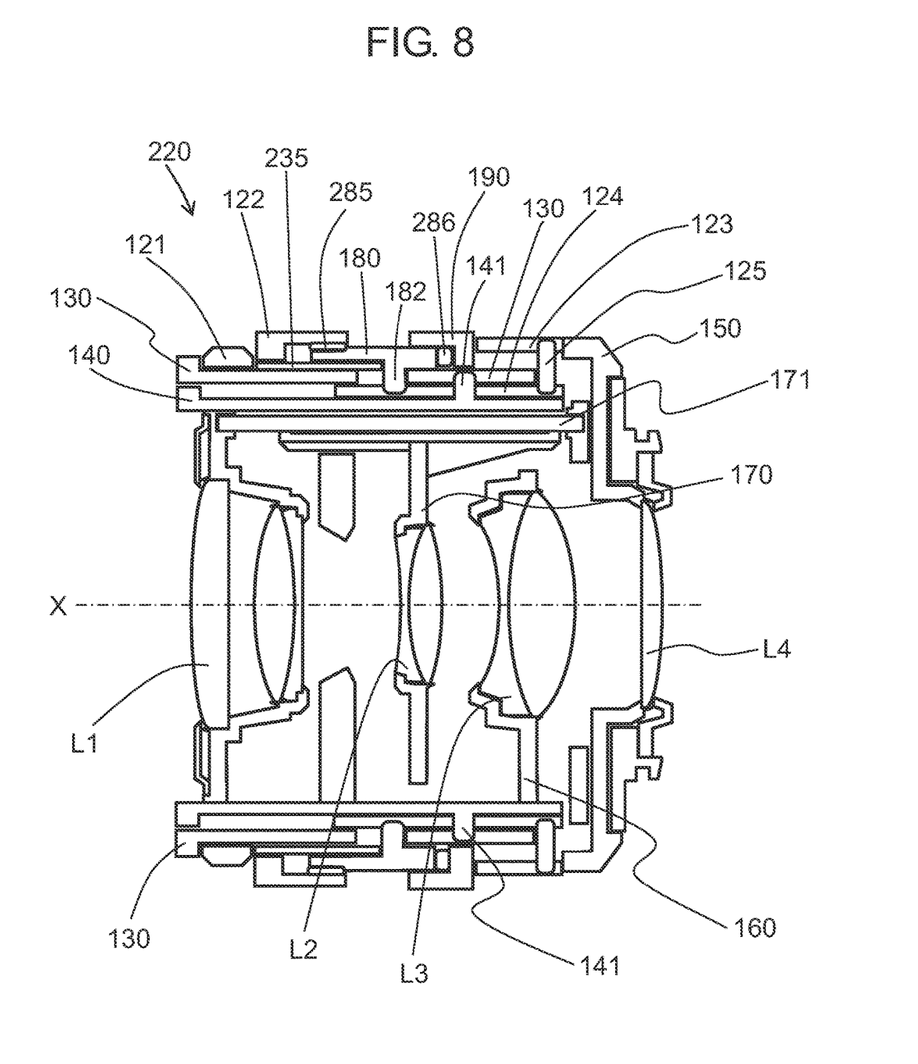
FIG. 8 is a schematic diagram illustrating a sectional configuration of a lens barrel in an imaging apparatus according to a second exemplary embodiment.

FIG. 8 is a schematic diagram illustrating a sectional configuration of lens barrel 220 in an imaging apparatus according to a second exemplary embodiment. In addition to the configuration of lens barrel 120 in the first exemplary embodiment, lens barrel 220 in the present exemplary embodiment has rectilinear guide 235 and dustproof sheets 285, 286. Since the other configuration is the same as the configuration of lens barrel 120, description is omitted.

As illustrated in FIG. 8, in lens barrel 220, rectilinear guide 235 is provided on an outer peripheral side of fixed frame 130 and on inner peripheral sides of focus ring 122 and index ring 180. Rectilinear guide 235 guides index ring 180 to move between focus ring 122 and decorative ring 190 in an optical axis X direction.

Further, as illustrated in FIG. 8, dustproof sheet 285 is provided between index ring 180 and focus ring 122 in a circumferential direction. Dustproof sheet 285 suppresses entry of foreign matter into lens barrel 220 from an opening between index ring 180 and focus ring 122 on an object side of index ring 180.

Further, as illustrated in FIG. 8, dustproof sheet 286 is provided between fixed frame 130 and decorative ring 190 in the circumferential direction and is provided between index ring 180 and decorative ring 190 in the optical axis X direction. Dustproof sheet 286 suppresses entry of foreign matter into lens barrel 220 from between index ring 180 and decorative ring 190 on a camera body side of index ring 180.

Other Exemplary Embodiments

As described above, exemplary embodiments are described as illustration of the technology disclosed in the present application. However, the technology in the present disclosure is not limited to this, and is appropriately applicable to exemplary embodiments where modifications, replacements, additions, omissions, or the like have been made. Further, a new exemplary embodiment can be made by combining the respective components described in the above-described exemplary embodiments.

As described above, the exemplary embodiments have been described as illustration of the technology in the present disclosure. The accompanying drawings and detailed description have been provided for the illustration.

Therefore, not only the components which are essential for solving the problem, but also the components which are not essential for solving the problem to illustrate the above-described technology can be included in the components described in the accompanying drawings and the detailed description. Accordingly, when those nonessential components are described in the accompanying drawings and the detailed description, those nonessential components should not be immediately recognized as essential components.

Further, since the aforementioned exemplary embodiments illustrate the technology in the present disclosure, various modifications, replacements, additions, omissions, or the like can be made within the claims and their equivalents.

INDUSTRIAL APPLICABILITY

The present disclosure is applicable to a lens barrel used in an imaging apparatus. Specifically, the present disclosure is applicable to a digital still camera, a single lens reflex camera, a mirrorless camera, and the like.

The invention claimed is:

1. A lens barrel comprising:
    an optical system formed of a plurality of lenses;
    a focusing manipulation unit that changes a focal position of the optical system in a normal photographing area and in a macro photographing area where the focal position is changed for an object located at a position shorter than a shortest distance position of the normal photographing area;
    a photographing mode switching unit that switches between a normal photographing mode and a macro photographing mode by moving at least a part of lenses among the plurality of lenses of the optical system; and
    an index ring having a normal scale and a macro scale, the normal scale indicating an object distance in the normal photographing mode, and the macro scale provided at a position different from the position of the normal scale and indicating the object distance in the macro photographing mode,
    wherein the photographing mode switching unit switches a display position of the index ring between the normal scale and the macro scale in order that one of the normal scale and the macro scale is displayed while an other one of the normal scale and the macro scale is not displayed, and
    the focusing manipulation unit changes the focal position displayed on the index ring by rotation manipulation.

2. The lens barrel according to claim 1, wherein the index ring has a shortest distance mark for each of the normal photographing mode and the macro photographing mode at a same phase position in a circumferential direction, and a longest distance mark for each of the normal photographing mode and the macro photographing mode at another same phase position in the circumferential direction.

3. The lens barrel according to claim 1, wherein the focusing manipulation unit has an auto focus setting part, and
    the index ring has an auto focus mode mark for each of the normal photographing mode and the macro photographing mode at a same phase position in the circumferential direction.

4. The lens barrel according to claim 1, wherein the index ring is engaged with the focusing manipulation unit and driven only in a rotation direction.

5. The lens barrel according to claim 1, wherein a dustproof sheet is interposed between the index ring and the focusing manipulation unit.

6. An imaging apparatus comprising the lens barrel according to claim 1.

* * * * *